July 31, 1945.   R. H. ZEILMAN ET AL   2,380,625
POWER SHOVEL, CRANE, AND THE LIKE
Filed Sept. 14, 1943   3 Sheets-Sheet 1

INVENTORS
Roy H. Zeilman
Alan Smythe
BY
[signature]
Attorney

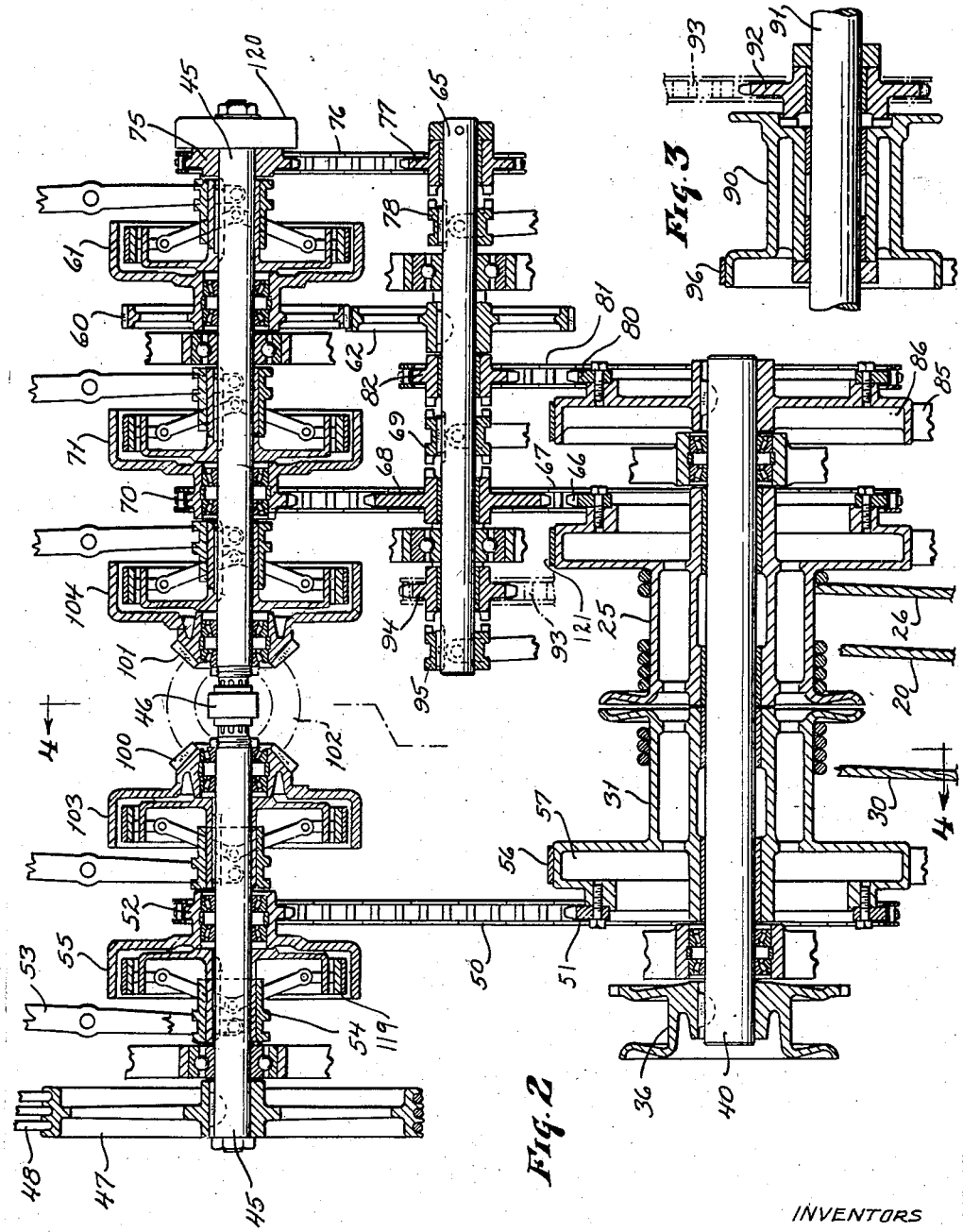

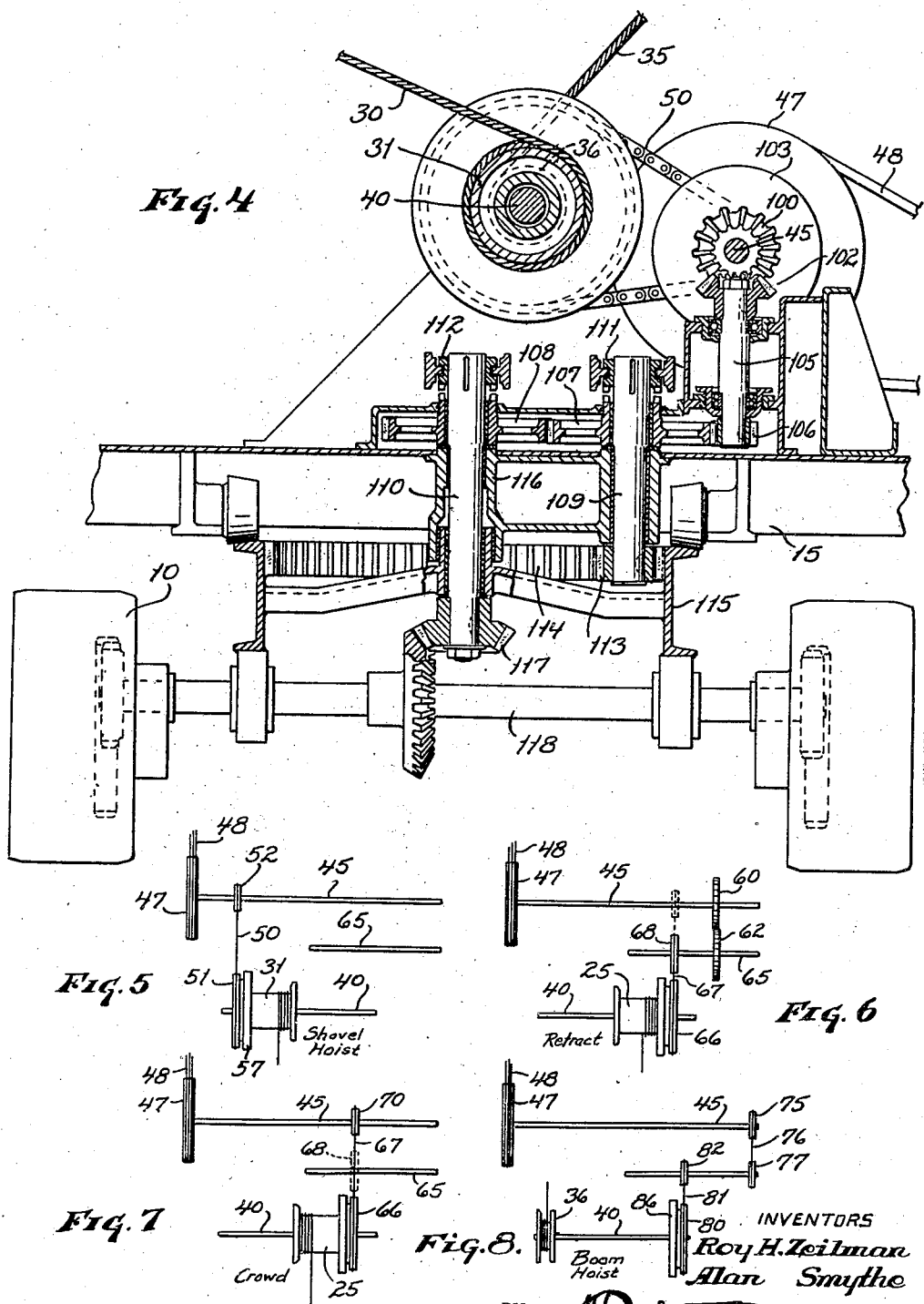

Patented July 31, 1945

2,380,625

UNITED STATES PATENT OFFICE 2,380,625

POWER SHOVEL, CRANE, AND THE LIKE

Roy H. Zeilman and Alan Smythe, Elyria, Ohio, assignors to The Thew Shovel Company, Lorain, Ohio, a corporation of Ohio Application September 14, 1943, Serial No. 502,354

10 Claims. (Cl. 214—135)

Our invention relates to automotive vehicular mechanisms for power shovels, cranes and the like, and relates more particularly to an improved power transmission means and to improved boom operating structure therefor and to an improved cable drive.

In prior automotive vehicular power operated load handling machines with which we are familiar, the power drive, turntable operating mechanism, drums, boom, dipper stick, hoist mechanism, crowd and retract mechanisms are so associated as to form a complicated mechanism requiring a large number of differently constructed parts, requiring a large stock of replacement parts for repair purposes.

One of the objects of our invention is to provide an automotive vehicular power operated load handling machine having a minimum of differently constructed parts, simple and relatively inexpensive to construct and highly efficient in use, requiring but few stock parts for repair purposes.

Another object of our invention is to provide the boom hoist cable and the shovel hoist wherein the crowd and retract cables are all mounted on drums carried on a single shaft and a plurality of these drums are independently driven from the main drive shaft.

Another object of our invention is to achieve the foregoing object in a machine as above set forth wherein all clutch mechanisms are also mounted on the main drive shaft and suitable mechanism is associated with said main shaft for operating both the crawler and the turntable mechanism.

Another object of our invention is to achieve the foregoing object in a machine as above set forth wherein all winding and unwinding operation for the boom structure proceeds from drums mounted on the same drum shaft and all clutches operate on a single drive shaft, whereby direct control of all operating functions is secured.

Another object of my invention is to provide, in a mobile power shovel or crane mechanism, a single drive shaft carrying a plurality of spaced power transmitting sprockets, and/or gears, each fixedly secured to a different one of a plurality of like brake drums, and each adapted, through the energization of a different, like, co-operating brake band, or equivalent, clutch device, to selectively transmit power from said shaft through said device and drum, to all the various functional elements of the mechanism, whereby all such clutch devices of like sizes and design are aggregated, on said shaft as a unit, with said shaft, for shipment or quick replacement, and whereby parts of the various clutches may be readily interchangeable.

Further improvements and important advantages will be apparent to those skilled in the art to which my invention appertains from a consideration of the following description and drawings, wherein:

Fig. 2 is a fragmentary sectional view taken on the line 2—2 of Fig. 1;

Fig. 3 is a fragmentary sectional view in the nature of an extension of Fig. 2;

Fig. 4 is an enlarged sectional view taken through the plane 4—4 of Fig. 2;

Figs. 5, 6, 7 and 8 are a series of diagrammatic views illustrating the driving connections to the drums for the shovel, hoist, retract, crowd and boom hoist operations, respectively.

Figure 1:
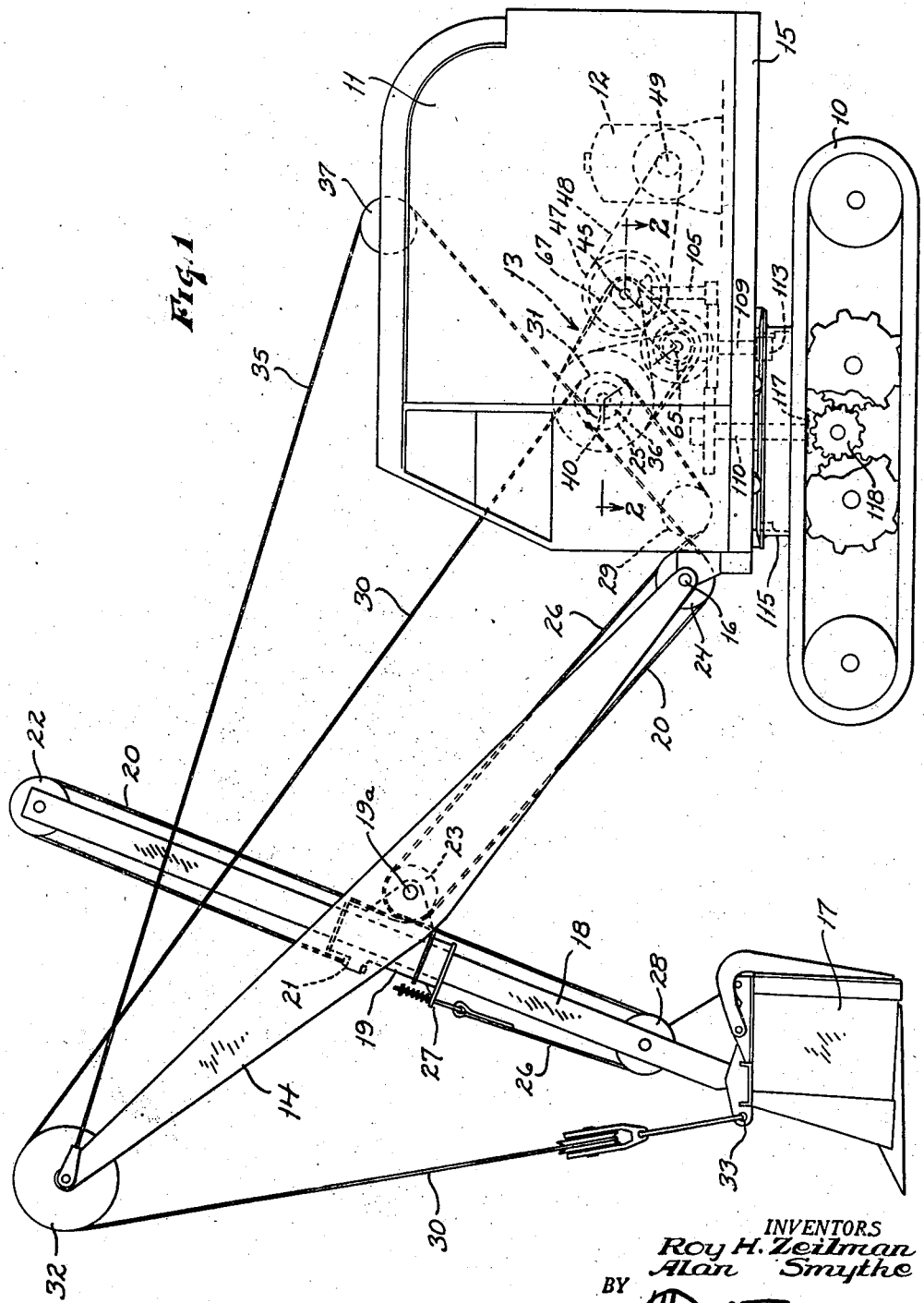
Fig. 1 is an elevational view of the automotive vehicular power operated load handling machine of our invention.

The embodiment illustrated is that of a power shovel, and the application of my invention to power cranes will, therefrom, be readily understood.

Referring now to the various figures of drawings and particularly to Fig. 1, at 10 we show a truck upon which a superstructure 11 is mounted. Said superstructure 11 comprises the power unit 12 and associated mechanism indicated generally at 13, said mechanism controlling the operation of the boom 14 and associated parts, and also movement of the truck 10. The super-structure 11 is mounted on a turntable 15 rotatably secured to the truck 10 and the boom 14 is hinged at its foot in the usual manner to a forward portion of the turntable, as shown at 16.

A bucket or scoop 17, in the form illustrated in Fig. 1, is affixed to a dipper stick 18 longitudinally slideable in a guiding member 19 which, in turn, is pivoted on a cross shaft 19a. The dipper stick is extended, or crowded, by means of a cable 20 secured at one end to the guide member as at 21 and then looping over a sheave 22 at the upper end of the dipper stick and back to one of a pair of sheaves 23 freely rotatable on the cross shaft 19a.

From there the cable extends along the boom, around a sheave 24 at its hinge, and is finally secured to a winding drum 25, to be later described. The dipper stick is retracted in a similar manner by means of a cable 26 which is secured to the guide as at 27, and then loops around a sheave 28 near the lower end of the dipper stick and back to the second sheave 23 and sheaves 24 and 29 and is finally secured to the drum 25, but wound in a direction opposite to that of cable 20.

A shovel hoist line 30 is further provided having one end secured to and wound around a hoist drum 31, to be later described, and passing over a sheave 32 mounted upon the outer end of the boom 14 and anchored to the outer end of dipper stick 18 and bucket 17, as shown at 33. A boom hoist cable 35 is secured to and wound around a winding drum 36 and extends from the said drum over a sheave 37 mounted upon the frame work of the superstructure to the outer end of the boom, whereby the boom may be raised or lowered.

It is to be noted, in Fig. 2, that all the drums to which the various hoist and crowd ropes are secured are mounted upon a single drum shaft 40 and that winding drums 25 and 31 are freely rotatable thereon while the boom hoist drum 36 is secured thereto and rotated thereby. Power is derived from the power unit 12 to drive the drums 25, 31 and 36 through a drive shaft designated generally at 45. This drive shaft preferably comprises a pair of shaft members united by a coupling 46 and disposed to the rear of and parallel to the drum shaft 40, although an integral shaft structure may be employed. The said drive shaft 45 derives its power through a pulley 47 drivingly secured at one end thereof and driven through a belt 48 by the engine pulley 49. A collar 120 and nut structure is secured to the opposite end of the shaft 45 whereby simple access to the clutch members mounted on the drive shaft is afforded and any necessary repairs or replacements easily made.

A plurality of identical clutch members, preferably of the internally expanding type, are mounted on the drive shaft 45, and sprockets and gears are associated with certain of said clutches whereby the drums mounted on said drum shaft are rotated to effect hoisting, crowding or retract operations of the boom and dipper stick structure and whereby the crawler and turntable operations may be effected.

Referring first to the shovel hoisting operation, and particularly to Figs. 2 and 5, it will be noted that the winding drum 31 is driven directly from the drive shaft 45 by means of a chain 50 connecting a sprocket 51 secured to the drum with a sprocket 52. Sprocket 52 is freely rotatable on the drive shaft but may be selectively clutched thereto by means of the manually operable clutch shifting fork 53 which operates through sleeve 54 to produce a driving connection between a spider 119, splined to the drive shaft, and the clutch drum 55 to which the sprocket 52 is secured.

To lower the bucket, the clutch may be disengaged and the unwinding of the drum 31 may be then controlled by means of a conventional brake comprising, for example, the brake band 56 and brake drum 57 integral with the winding drum.

The crowd and retract drum 25, Figs. 2 and 6, may be driven in either direction so as to crowd or retract the dipper stick under power. In the retracting operation, power is transmitted to the drum 25 from a gear 60 mounted on the drive shaft 45 and selectively driven thereby through a clutch 61 identical with the clutch 55 before mentioned. The gear 60 is in constant mesh with a similar gear 62 keyed to an intermediate countershaft 65 and thus operates to drive said shaft whenever clutch 61 is engaged. A sprocket 66 secured to the winding drum 25 is connected by a chain 67 with a sprocket 68 freely rotatable on the countershaft but adapted to be driven thereby through a jaw clutch 69 splined to the countershaft. Thus, the crowd and retract drum is driven from the drive shaft 45 through the intermediary of the countershaft 65, and in a direction of rotation opposite to that of the drive shaft due to the relative rotations of the gears 60 and 62.

In the crowding operation, the crowd and retract drum 25, Figs. 2 and 7, is driven in a direction opposite to that just described, and at a lower rate of speed for greater accuracy in the operative placement of the bucket and increased power. In this operation, the beforementioned sprocket 66 on the drum is driven, by means of the chain 67, by a small sprocket 70 normally freely rotatable on the drive shaft 45 but adapted to be clutched thereto through the clutch 71. It will be noted that the chain 67 follows a triangular course, indicated in Fig. 1, around the three sprockets, the drum sprocket 66 being driven from either of the sprockets 68 or 70 as determined by the setting of clutches 61, 69 and 71.

In either the crowd or retract operation, it is to be noted that the unwinding of the cable 20 and the winding of the cable 26 may be controlled by means of the brake 121 comprised of the brake band 122 and brake drum 123 formed integral with the crowd and retract drum, hence the load can be "driven" down on the crowding operation against the variable action of the brake 121.

Coming now to the boom hoisting operation, it will be noted that the winding drum 36 therefor, as shown in Figs. 2 and 8, is keyed to the shaft 40 upon which the other drums idle. Also, keyed to this shaft is a sprocket 80 which is driven through a chain 81 by a small sprocket 82 free on the countershaft.

The jaw clutch 69, hereinbefore mentioned in association with the sprocket 68, is also adapted to engage the sprocket 82 and hence to drive the drum shaft 40 and the boom hoist drum 36 keyed thereto. The boom may be lowered by disengaging the clutch 61 and allowing the drum 36 to freely unwind under the control of a conventional brake band 85 on the drum 86.

Frequently, it is desired to lower the boom at a controlled speed and this is conveniently accomplished by the provision of the elements comprising the over-running clutch 120, sprocket 75, chain 76, sprocket 77 and clutch 78.

With brake 85 and clutch 61 both released and clutch 78 engaged with sprocket 77, the force of gravity causes the boom to fall and unwind the cable from drum 36 causing it to revolve in a counterclockwise direction, which is opposite to the winding direction. This drives shaft 40, sprocket 80 and shaft 65 through chain 81 and sprocket 82. Sprocket 77 drives shaft 45 through chain 76, sprocket 75 and overrunning clutch 120 in the same direction which it is turning. Shaft 45 revolves at a constant speed due to the control of the governor of the engine which, as previously stated, is in driving relation to shaft 45 through the pulley 47 and belts 48. The constant speed of shaft 45 reacting through the elements above mentioned to the drum shaft 40 insures a controlled speed of rotation of the drum 36 and the lowering of the boom is accomplished at a correspondingly controlled rate.

An additional winding drum 90 indicated in Fig. 3 may be incorporated for use as a power winch or similar purpose. The drum is shown as mounted on an auxiliary shaft 91 and drivingly engaged by a sprocket 92 which is connected by a chain 93 with a sprocket 94 free on the countershaft of Fig. 2 and adapted to be driven thereby through a jaw clutch 95 splined on the countershaft. The unwinding of the drum 90 may be controlled by means of a conventional brake 96.

The last of the mechanisms which derive power from the drive shaft 45 is that associated with the turntable swing and crawler drive. As shown in Fig. 2, two bevel gears 100 and 101 are freely rotatable on the drive shaft and are in constant mesh with a third bevel gear 102. Either of the gears 100 and 101 may be selectively driven by the drive shaft through its respective clutch 103 or 104, and the gear 102 may thus be driven in either direction.

As shown in Fig. 4, the gear 102 is keyed to a vertical shaft 105 having also keyed thereto, at its lower end, a pinion 106. A gear 107 is in constant mesh with both the pinion and a second gear 108, both gears being freely mounted on vertical shafts 109 and 110, respectively, to which they may be selectively drivingly engaged by means of jaw clutches 111 and 112. Shaft 109 operates to swing the turntable and superstructure relative to the undercarriage and to this end has secured thereto a pinion 113 meshing with an internal ring gear 114 formed as a part of the turntable support 115.

Shaft 110 operates to drive the crawler mechanism and hence extends downwardly through the hollow kingpin 116 to drive a bevel gear 117 which, in turn, transmits power through the intermeshed gear 133 to the crawler drive shaft indicated at 118 whereby the tracks 10 are driven in any well known manner.

The clutches of our invention, are, as above stated, of the internally expanding type and it is to be noted that they are all similarly formed so that the same size and shape of clutch may be used in either one of the five positions on the main drive shaft where such clutches are used. The operating mechanism for each of all said clutches is interchangeable and all of said clutches, being of the same size and having the same operating parts, are adapted to frictionally transmit the same amount of load at the same drive shaft speed. In other words, the clutches are interchangeable and only one type clutch needs to be used in the construction of my machine or in the repair thereof.

The above objective, of operating each and everyone of the winding drums to achieve all of the excavator functions and to operate the swinging of the turntable and also propelling of the vehicle, in all cases, through a like friction clutch having the same load capacity at drive shaft speeds, is achieved by virtue of the provision of speed reducing driving connections of the propel speed reduction ratio between each said clutch and the particular instrumentality ultimately driven by power supplied through any such frictional clutch through said driving connections, this, in turn, resulting in the driving of each and every instrumentality at a most efficient desirable speed, and whereby the load, imposed upon each and every clutch, is substantially identical, and in any case, well within the maximum load which the particular drive shaft clutches can handle without overload.

In the achievement of the above objective, applicants have also so proportioned the driving connections, leading from each of the clutches to the instrumentalities served thereby, whereby the load imposed upon each said clutch is substantially the same as that upon each of the other clutches in order to achieve substantial standardization of the design of all of said clutches.

It is to be noted that the clutch means whereby all propulsion or rotation of the machine, as well as motivation of all load handling means employed therewith is achieved, are mounted on a single drive shaft, and that the particular drums mounted on a single drum shaft are independently driven or actuated directly from the drive shaft. Thus, it can readily be seen that the machine may be simply and efficiently operated.

Although we have shown and described certain preferred embodiments of our invention, we are aware that numerous and extensive departures may be made therefrom without departing however from the spirit of our invention and the scope of the appended claims.

We claim:

1. In an excavating machine of the type described, the combination with a prime mover, a drive shaft and driving connections between said prime mover and said shaft adapted to effect constant driving of said shaft during all normal excavating operations by said machine, a plurality of selective clutch means mounted thereon, a single drum shaft, a crowd and retract drum, a boom hoist drum and a hoist drum mounted upon said drum shaft, said crowd and retract drum and said hoist drum being freely rotatable on said drum shaft, and said boom hoist drum being keyed thereto and rotatable therewith, power transmission means for each said drum interconnecting said drums and relatively different of said clutch means, operator controllable means for selectively operating any of said clutch means to effect selective driving by said drive shaft of any of said drums, said clutch means providing the only means to communicate power from said prime mover to said drums and said drum shaft.

2. In a mobile crane, shovel or the like, the combination with a vehicle chassis, supporting propelling means therefor, a superstructure journalled upon said chassis for rotation thereon, a drive shaft constantly driven by said prime mover, a plurality of independently operable clutch members mounted on said drive shaft, certain of said clutch members associated with load handling mechanism, a pair of spaced opposing bevel gears journalled on said drive shaft, certain of said independently operable clutches adapted to alternately drive either of said gears from said shaft, a driven crown pinion constantly meshed with both of said gears, relatively spaced parallel vehicle propeller and superstructure swinging shafts, respectively adapted, when rotated in either direction, to drive said propelling means, and to rotatably swing said superstructure, an intermeshed pair of gears respectively journalled on said propeller and swing shafts respectively, transmission means for simultaneously transmitting rotary driving power from said crown gear to said intermeshed pair of gears, and independently operable clutch means on both said propeller and swing shafts to independently clutch the associated one of said pair of gears to each said shaft.

3. A mobile power shovel or crane mechanism comprising a mobile chassis and a platform carried thereby, a boom mounted on the platform, a dipper stick mounted on the boom, crowd and retract mechanism mounted on the boom and operatively associated with the dipper stick, a boom hoist, a dipper carried by the forward end of the dipper stick, winding drums for each said hoist line and for said crowd and retract mechanism, a prime mover and a live drive shaft constantly driven thereby during use of the mechanism both mounted on the platform, propelling means for said chassis and swing means for rotating said platform, a plurality of operator controlled clutch devices disposed in spaced relation on said drive shaft, transmission means to transmit power from selected of said clutch devices to any of said winding drums, said propelling means and said platform swing means, said transmission means comprising speed reducing and rotational reversing means whereby said clutch devices may be of like power transmitting characteristics and whereby the rotational speeds of said drums, said swing means and said propelling means may be different, and said propelling means, said swing means and said crowd and retract winding drum may be rotated in either of opposite directions, and whereby said clutch devices may comprise like interchangeable power transmitting parts.

4. In an excavating machine of the type described, a prime mover, a live drive shaft associated therewith and constantly driven thereby during all functional operations of said machine, a dipper stick control mechanism, travel mechanism, boom control mechanism and swing mechanism operable in either direction, all of said mechanisms being operable from said drive shaft, a plurality of clutch means being mounted upon said shaft and adapted to be selectively engaged therewith to control any of the said mechanisms, operator controllable means for selectively effecting clutching engagement between said shaft and any desired of said clutch means, a crowd and retract drum, a boom hoist drum and a hoist drum being mounted upon a common drum shaft and adapted to be independently directly operated through said clutch means, all driving connections between any of said drums and said prime mover comprising at least one of said clutch means.

5. In an excavating machine of the type described, a prime mover, a live drive shaft associated therewith and constantly driven thereby during all functional operations of said machine, a turntable, a travel mechanism, load handling mechanism, a source of power, a drive shaft, means to continuously transmit power transmitted from said source to the drive shaft during all functional operations of said machine, said drive shaft having mounted thereon a plurality of friction clutch means freely rotatable thereon, means associated with said drive shaft and said clutch means whereby each of the clutch means may be selectively clutched to the drive shaft, whereby to selectively operate manually operable means adapted when operated to selectively operate any desired of said clutch means to effect driving connection between said shaft and any of said clutching means, and a plurality of driving connections extending between each of said clutch means each adapted, when the associated clutch means is driven by said drive shaft, to communicate power from said drive shaft to one of said mechanisms or turntable, and other complementary driving connections each extending between other of said clutch mechanisms for operating said mechanisms in the opposite direction, all of said mechanisms being operable solely under the control of certain of said clutch means, said travel mechanism and said load handling mechanism are operable in opposite directions by the selective operation of said manually controlled means, and in all cases receive power through certain actuated of said friction clutch means.

6. In an excavating machine of the type described, a dipper stick control mechanism, travel mechanism, boom control mechanism and swing mechanism operable in either direction, all of said mechanisms being operable from a common drive shaft, a plurality of clutch means being mounted upon said shaft and adapted to be selectively engaged therewith to control any of the said mechanisms, a crowd and retract drum, a boom hoist drum and a hoist drum being mounted upon a common drum shaft and adapted to be independently directly operated through said clutch means comprising a supplemental shaft, a pair of bevelled gears rotatably mounted thereon, clutching means to selectively clutch a selected one of said bevelled gears to said shafts, a gear meshed with both said bevelled gears rotatable in opposite directions by either of said gears according to the selecting operation of said clutch means, driving connections between said drive shaft and said supplemental shaft, and transmission means between said gear and said travel mechanism whereby, by operation of said clutch means, said travel mechanism may be operated to propel the vehicle in either direction independently of the operation of said dipper stick control mechanism, said boom control mechanism, said swing mechanism, said clutch means and said drums.

7. In a load handling mechanism of the class described, a single drive shaft, a drive pulley fixed to and adapted to communicate driving motion to said shaft, each of said drums provided with an axially projecting hub portion, a pair of said hub portions having gear teeth formed thereon and the other of said hub portions having sprocket teeth formed thereon, said gear teeth being of the bevel type and being relatively confronting, clutching elements within said clutch drums and adapted for selective operation to selectively clutch said drums to said shaft, a ring gear having bevel teeth constantly in mesh with the bevel teeth of said pair of clutch hubs whereby selective actuation of the clutch means of said pair of clutch drums will effect driving of said ring gear from said shaft in selected different directions, all of the cable winding drums for operating the load handling mechanism being mounted on a single drum shaft, each of said cable winding drums carrying sprocket teeth and chain drive means effecting driving connections between the sprocket teeth of an associated clutch drum, hubs on the drive shaft and said winding drum.

8. In a load handling mechanism of the class described, a single drive shaft, a drive pulley fixed to and adapted to communicate driving motion to said shaft, each of said drums provided with an axially projecting hub portion, a pair of said hub portions having gear teeth formed thereon and the other of said hub portions having sprocket teeth formed thereon, said gear teeth being of the bevel type and being relatively confronting, clutching elements within said clutch drums and adapted for selective operation to selectively clutch said drums to said shaft, a ring gear having bevel teeth constantly in mesh with the bevel teeth of said pair of clutch hubs whereby selective actuation of the clutch means of said pair of clutch drums will effect driving of said ring gear from said shaft in selected different directions, all of the cable winding drums for operating the load handling mechanism being mounted on a single drum shaft, each of said cable winding drums carrying sprocket teeth and chain drive means effecting driving connections between the sprocket teeth of an associated clutch drum, hubs on the drive shaft and said winding drum, a vehicle propulsion shaft and a superstructure rotating shaft, a shaft carrying said ring gear and gear means adapted to communicate driving motion from said ring gear shaft to either of said propulsion or vehicle rotating shafts.

9. In a mobile excavator of the type employing a turntable carrying boom, the combination with said turntable and boom of a mobile chassis supporting the turntable, reversible propelling mechanism for said chassis, driving connections, mechanism for rotating the turntable in either opposite direction, a longitudinally reciprocable dipper stick pivotally carried on said boom intermediate its ends, a dipper pivotally carried on the end of said dipper stick, a cable for raising and lowering the boom, another cable for upturning the dipper on its pivots and for elevating the dipper supporting end of the dipper stick and a pair of cables for longitudinally moving said dipper stick in both directions to crowd and retract the dipper, a winding drum mechanism for said boom hoist cable, a second winding drum mechanism for said dipper upturning and elevating cable and a third winding drum mechanism for said crowd and retract cables, said crowd and retract cables respectively windable upon said third drum mechanism responsive to opposite rotational movements thereof, a prime mover and a power drive shaft constantly driven in the same direction by said prime mover during all operative periods of the excavator, a plurality of friction clutches comprising clutching and driven elements, speed reducing transmission means interposed between each said propelling mechanism, said turntable rotating mechanism and each of said winding drums respectively different of said clutch driven elements, the friction clutching device for each said clutch element adapted when energized to frictionally drive an associated of said elements from said drive shaft, and said clutching elements adapted when energized to frictionally transmit driving power from said shaft to the associated driven clutch element, operator controllable means for selectively energizing said friction clutching devices, and speed reducing transmission means for transmitting power from said driven clutch element to an associated one of said mechanisms, the ratio of speed reduction in each case being such as to operate the associated mechanism at usual normal speeds and all power to each and all of said mechanisms being transmitted from said prime mover through said drive shaft and certain said friction clutches and the speed reduction ratios of said transmission means being relatively different in accordance with the varying normal speeds of the different mechanisms and all of said friction clutches being of like design and each adapted to deliver like amounts of power.

10. In a mobile power excavator, the combination of a mobile vehicular chassis, propelling mechanism therefor, a turntable rotatably carried upon said chassis, mechanism for rotating the turntable in either direction, a boom, a shipper shaft thereon, separate hoist cables for said boom and shipper shaft, crowd and retract cables for said boom and shipper shaft, winding drum means for selectively operating each said cable, a prime mover and a power shaft driven thereby on the turntable, a plurality of clutch elements separately journalled upon said power shaft and separate friction clutch means for each said element each adapted when energized to frictionally clutch said shaft to the clutch means associated with said element, and a plurality of speed-reducing driving connections between each said element and one of said mechanisms, or a cable winding element of said drum means, the ratio of speed reduction of each of said driving connections being such as to drive each of the associated mechanisms or winding elements at its normal working speed, and with resultant imposition of substantially equal loads upon the associated friction clutch means, whereby said friction clutch means may be alike and relatively interchangeable, and operator controllable means for selectively operating each said clutch means, whereby all power for all said mechanisms and drum means is derived from a common shaft, entirely through friction clutch means carried thereby.

ROY H. ZEILMAN.
ALAN SMYTHE.